US012284502B2

(12) United States Patent
Liu et al.

(10) Patent No.: US 12,284,502 B2
(45) Date of Patent: Apr. 22, 2025

(54) AUDIO PROCESSING METHOD, ELECTRONIC DEVICE, AND COMPUTER-READABLE STORAGE MEDIUM

(71) Applicant: SZ DJI TECHNOLOGY CO., LTD., Shenzhen (CN)

(72) Inventors: Yang Liu, Shenzhen (CN); Pinxi Mo, Shenzhen (CN); Yunfeng Bian, Shenzhen (CN); Zheng Xue, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 228 days.

(21) Appl. No.: 17/990,870

(22) Filed: Nov. 21, 2022

(65) Prior Publication Data

US 2023/0088467 A1 Mar. 23, 2023

Related U.S. Application Data

(63) Continuation of application No. PCT/CN2020/092891, filed on May 28, 2020.

(51) Int. Cl.
*H04R 5/04* (2006.01)
*H04R 3/00* (2006.01)

(52) U.S. Cl.
CPC ............... *H04R 5/04* (2013.01); *H04R 3/005* (2013.01)

(58) Field of Classification Search
CPC ............ H04R 5/04; H04R 3/005; G06F 3/165
See application file for complete search history.

(56) References Cited

U.S. PATENT DOCUMENTS

| | | | | |
|---|---|---|---|---|
| 9,674,453 | B1 * | 6/2017 | Tangeland | H04N 23/661 |
| 10,447,970 | B1 * | 10/2019 | Chu | H04N 7/147 |
| 2006/0082655 | A1 * | 4/2006 | Vanderwilt | H04N 23/50 348/E5.026 |
| 2015/0189436 | A1 | 7/2015 | Kelloniemi | |

(Continued)

FOREIGN PATENT DOCUMENTS

| | | | |
|---|---|---|---|
| CN | 1901663 | A | 1/2007 |
| CN | 105474666 | A | 4/2016 |
| CN | 106686316 | A | 5/2017 |

(Continued)

OTHER PUBLICATIONS

International Search Report (Feb. 19, 2021).

*Primary Examiner* — Fan S Tsang
*Assistant Examiner* — David Siegel
(74) *Attorney, Agent, or Firm* — FIDELI LAW PLLC

(57) ABSTRACT

An audio processing method includes: obtaining relative attitude information between a lens and a plurality of microphones, where the lens is movable relative to at least one of the plurality of microphones; obtaining original audio signals acquired by the plurality of microphones; determining weight information corresponding to the original audio signals based on the relative attitude information; and synthesizing the original audio signals based on the weight information to obtain a target audio signal, where the target audio signal is played with images captured by the lens. The method disclosed in this application resolves a problem that a sound source orientation indicated by recorded audio does not match the images captured by the lens.

20 Claims, 6 Drawing Sheets

(56) References Cited

U.S. PATENT DOCUMENTS

| | | | | |
|---|---|---|---|---|
| 2019/0246203 | A1* | 8/2019 | Elko | H04R 1/406 |
| 2022/0116700 | A1* | 4/2022 | Qian | H04R 1/326 |

FOREIGN PATENT DOCUMENTS

| | | | |
|---|---|---|---|
| CN | 107004426 | A | 8/2017 |
| CN | 107333093 | A | 11/2017 |
| CN | 110389597 | A | 10/2019 |
| CN | 112637529 | A | 4/2021 |
| JP | 2019013765 | A | 1/2019 |

* cited by examiner

AUDIO PROCESSING METHOD, ELECTRONIC DEVICE, AND COMPUTER-READABLE STORAGE MEDIUM

RELATED APPLICATIONS

This application is a continuation application of PCT application No. PCT/CN2020/092891, filed on May 28, 2020, and the content of which is incorporated herein by reference in its entirety.

TECHNICAL FIELD

This disclosure relates to the technical field of audio processing, and in particular, to an audio processing method, an electronic device, and a computer-readable storage medium.

BACKGROUND

A lens of an electronic device such as a gimbal camera or a surveillance camera may move under drive of a motor. To prevent noise interference and avoid a lens structure that is too complex, a microphone for acquiring audio is usually not provided on the lens, but on another component that does not rotate with the lens. In this way, when the lens rotates, an angle of view of images captured by the lens correspondingly changes, but a sound source orientation indicated by the audio acquired by the microphone cannot adapt to the change in the angle of view of the captured images, resulting in inconsistent visual and auditory senses of orientation of a captured video.

BRIEF SUMMARY

To resolve the foregoing problem that a sound source orientation indicated by recorded audio does not match images captured by a lens, embodiments of this disclosure provide an audio processing method, an electronic device, and a computer-readable storage medium.

A first aspect of some exemplary embodiments of this disclosure provides an audio processing method, including: obtaining relative attitude information between a lens and a plurality of microphones, where the lens is movable relative to at least one of the plurality of microphones; obtaining original audio signals by the plurality of microphones; determining weight information of the original audio signals based on the relative attitude information; and synthesizing the original audio signals based on the weight information to obtain a target audio signal to be played with images captured by the lens.

A second aspect of some exemplary embodiments of this disclosure provides an audio processing method, including: obtaining original audio signals by a plurality of microphones; synthesizing the original audio signals based on initial weight information of the original audio signals to obtain a target audio signal to be played with images captured by a lens; determining that the lens moves relative to at least one of the plurality of microphones; obtaining relative attitude information between the lens and the plurality of microphones; and adjusting the initial weight information based on the relative attitude information.

In the audio processing method provided in some exemplary embodiments of this disclosure, when the target audio signal is obtained by synthesizing the original audio signals acquired by a plurality of microphones, the weight information corresponding to the original audio signals is determined based on the relative attitude information between the lens and the microphones corresponding to the original audio signals. In this way, even if an angle of view of the images captured by the lens changes relative to the microphones, the target audio signal obtained after the synthesis based on the relative attitude information may still match the images captured by the lens, so as to provide users with consistent visual and auditory senses of orientation.

BRIEF DESCRIPTION OF THE DRAWINGS

To describe the technical solutions in some exemplary embodiments of this disclosure, the accompanying drawings required to describe the embodiments will be briefly described below. Apparently, the accompanying drawings described below are only some exemplary embodiments of this disclosure. Those of ordinary skill in the art may further obtain other accompanying drawings based on these accompanying drawings without creative efforts.

DETAILED DESCRIPTION

The technical solutions in some exemplary embodiments of this disclosure will be described below with reference to the accompanying drawings. Apparently, the described embodiments are merely some rather than all of the embodiments of this disclosure. All other embodiments obtained by those of ordinary skill in the art based on the embodiments of this disclosure without creative efforts should fall within the scope of protection of this disclosure.

An electronic device with a video photographing function may be provided with a lens and a microphone. The lens, also referred to as a camera, may be used to capture images. The microphone may be used to acquire audio. After the captured images and the acquired audio are encapsulated in a specific format, a video (audio/video) may be obtained.

For convenience, the electronic device with the video photographing function is referred to as a photographing device in the exemplary embodiments of this disclosure. A lens of a traditional photographing device is fixed. When a user wants to photograph an object at different positions, the user needs to manually adjust a position of the photographing device such that the lens may aim at the object to be photographed. However, with development of science and technology, there are some new photographing devices whose lenses are no longer fixed, but may autonomously move or rotate as driven by of motors. There are many such photographing devices having movable lenses, such as an unmanned aerial vehicle (UAV) equipped with a gimbal, a gimbal camera, a surveillance camera, a robot, and a panoramic camera.

A gimbal camera may be used as an example for description. A lens of the gimbal camera may move. For example, when an intelligent tracking photographing function is enabled, the lens may lock onto a target and automatically rotate as the target moves. In another example, after a user inputs a rotation command, the lens may rotate as instructed by the rotation command.

To prevent noise interference of a gimbal and avoid an over-complex structure of the lens, a microphone for acquiring audio is usually not provided on the lens, but on another component that does not rotate with the lens, such as a base of the gimbal. In this way, when the lens of the gimbal camera rotates, an angle of view of images captured by the lens correspondingly changes, but a sound source orientation indicated by the audio acquired by the microphone cannot adapt to the change in the angle of view of the captured images, resulting in inconsistent visual and auditory senses of orientation of users for a captured video. This greatly affects user experience and even causes some users to have adverse reactions such as dizziness.

Figure 1:
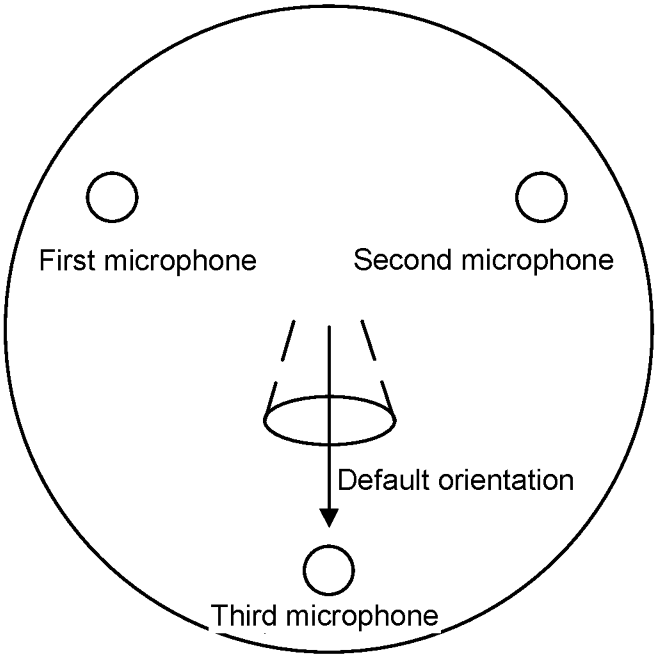
FIG. 1 is a top view of a simplified gimbal camera according to some exemplary embodiments of this disclosure.

FIG. 1 is a top view of a simplified gimbal camera according to some exemplary embodiments of this disclosure. The gimbal camera is equipped with three microphones: a first microphone, a second microphone, and a third microphone. The three microphones are mounted on a base of a gimbal in a triangular layout. In a center of the triangle formed by the three microphones is a position of a lens. The lens may rotate 360°.

A person determined the sound orientation based on a difference between sound heard by the left and that heard by the right ear. In addition, at least two channels are required for a recorded audio to have a stereo effect. Multi-channel audio may be recorded by using a plurality of microphones. Specifically, during the recording, the plurality of microphones may simultaneously record (acquire) audio. Further, a plurality of pieces of recorded audio may be synthesized to obtain multi-channel audio. The three microphones in FIG. 1 are used as an example. If recorded channels include a left channel and a right channel, an audio signal $D_L$ on the left channel and an audio signal $D_R$ on the right channel may be obtained through synthesis based on the following formulas:

$$D_L=w_{1L}D_1+w_{2L}D_2+w_{3L}D_3$$

$$D_R=w_{1R}D_1+w_{2R}D_2+w_{3R}D_3$$

where $D_i$ represents an original audio signal acquired by an $i^{th}$ microphone (i=1, 2, 3), and $w_i$ represents weights corresponding to the $i^{th}$ microphone. It should be noted that each microphone corresponds to two weights: one weight corresponding to the left channel and the other weight corresponding to the right channel. For example, the first microphone corresponds to two weights $w_{1L}$ and $w_{1R}$, where $w_{1L}$ corresponds to the left channel, and $w_{1R}$ corresponds to the right channel. Correspondingly, the second microphone also corresponds to two weights $w_{2L}$ and $w_{2R}$, and the third microphone also corresponds to two weights $w_{3L}$ and $w_{3R}$.

These weights are fixed weights predetermined during previous work. Generally, the weights are determined in the following manner: firstly, designate an orientation as a default lens orientation (hereinafter referred to as the default orientation); next, determine the weights corresponding to audio signals acquired by the microphones based on the default orientation and the layout of the microphones.

For ease of understanding, an example regarding how the weights are determined is provided below with reference to FIG. 1. As shown in FIG. 1, if an orientation of the third microphone relative to the lens (the arrow in the figure) is designated as the default orientation, the first microphone is located on a left side relative to the default orientation, the weight $w_{1R}$ corresponding to the left channel may be set to an appropriate non-zero value, and the weight $w_{1R}$ corresponding to the right channel may be set to 0. In other words, the audio signal acquired by the first microphone does not need to participate in the synthesis for obtaining $D_R$. Similarly, the second microphone is located on a right side relative to the default orientation, the weight $w_{2R}$ corresponding to the right channel may be set to an appropriate non-zero value, and the weight $w_{2L}$ corresponding to the left channel may be set to 0. In other words, the audio signal acquired by the second microphone does not need to participate in the synthesis for obtaining $D_L$. In this case, the synthesis formulas for obtaining $D_L$ and $D_R$ are simplified as follows:

$$D_L=w_{1L}D_1+w_{3L}D_3$$

$$D_R=w_{2R}D_2+w_{3R}D_3$$

Since the foregoing weights corresponding to the microphones are determined under the assumption that an orientation of the lens is the default orientation, a sound source orientation indicated by the synthesized audio signals may match an angle of view of captured images only in the case where an actual orientation of the lens is the same as (or close to) the default orientation. In other words, if the actual orientation of the lens is different from the default orientation, the sound source orientation indicated by the synthesized audio signals does not match the angle of view of the captured images.

Figure 2A:
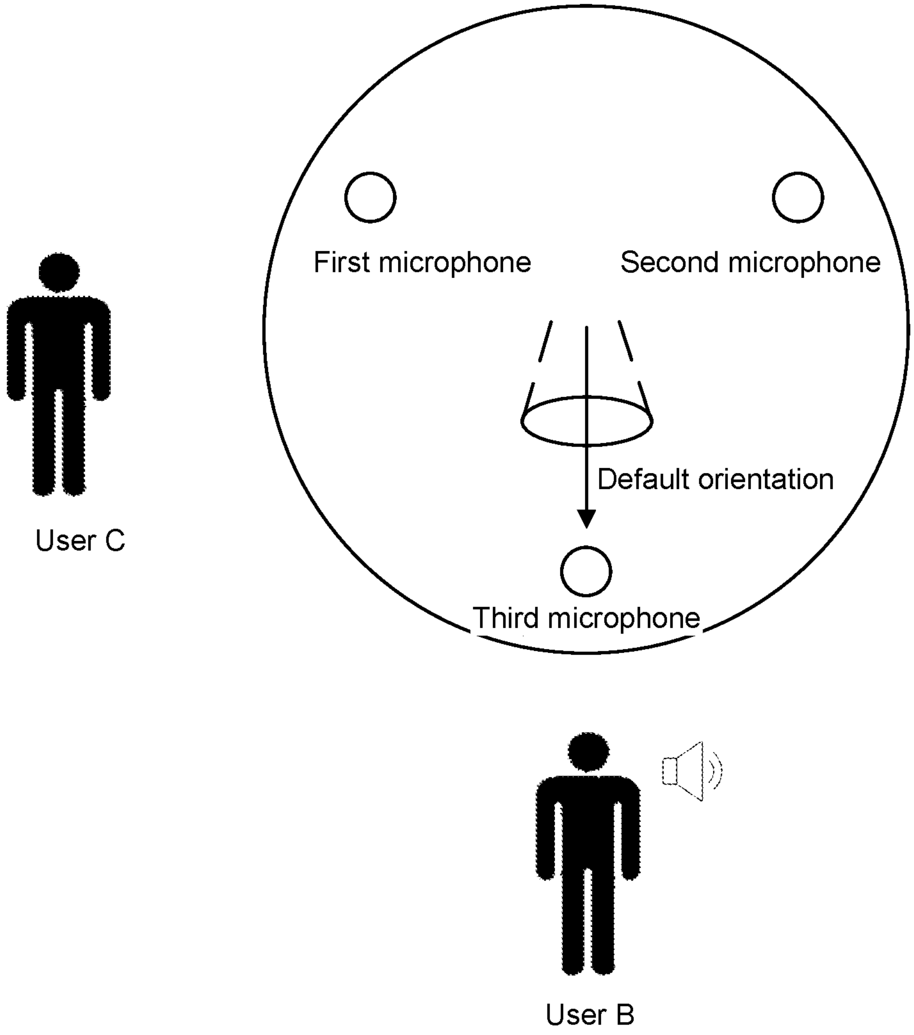
FIG. 2A is a schematic diagram of a scenario of video photographing before a lens rotates according to some exemplary embodiments of this disclosure.
Figure 2B:
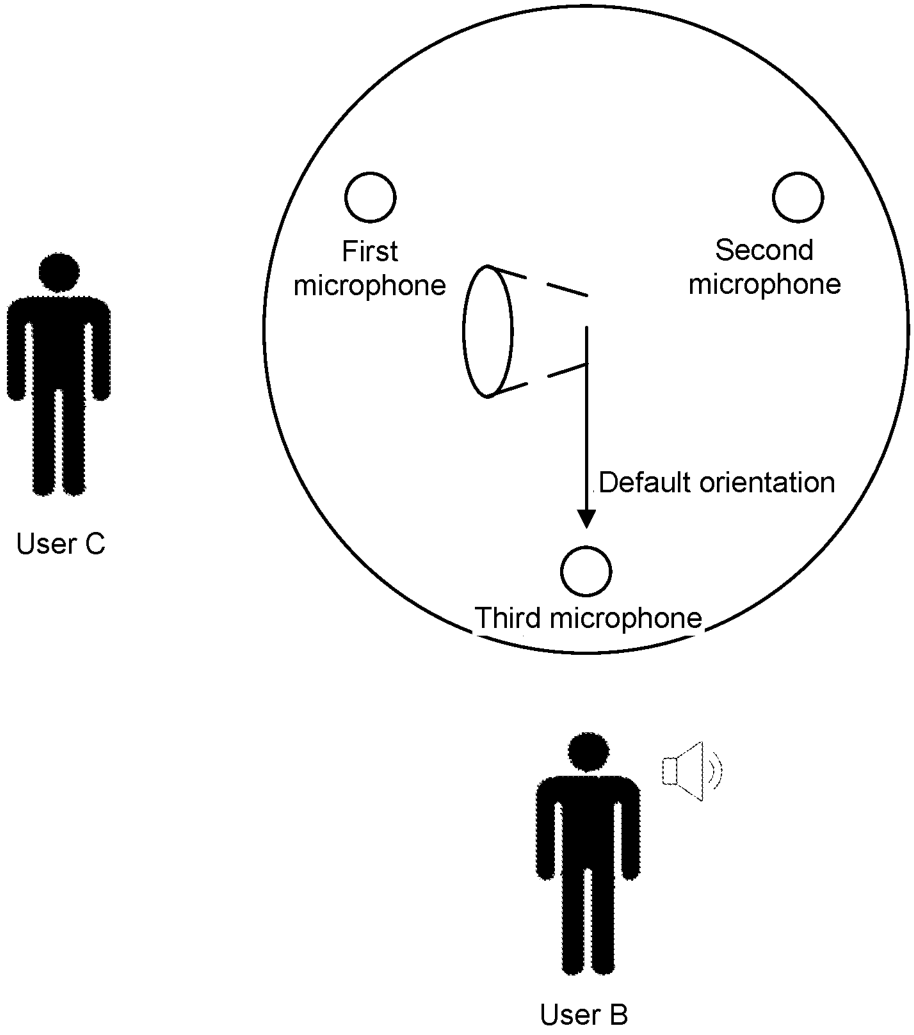
FIG. 2B is a schematic diagram of a scenario of video photographing after a lens rotates according to some exemplary embodiments of this disclosure.

A specific example of video photographing is provided below. Reference may be made to FIG. 2A and FIG. 2B. The gimbal camera in FIG. 1 is shown in these figures. In a scenario shown in FIG. 2A, if the gimbal camera is controlled by a user A, when a user B is speaking at the beginning of video photographing, the user A photographs the user B. However, after photographing the user B for a period of time, the user A finds that an expression of a user C is very interesting, and then the user A manipulates the lens to rotate to aim at the user C (a body of the gimbal camera does not rotate during the rotation of the lens), as shown in FIG. 2B.

The sound source orientation indicated by the recorded audio always matches the default orientation. In practice, a sound source (the user B) is in the orientation of the third microphone relative to the lens, which is exactly the default orientation. Therefore, the sound source orientation indicated by the recorded audio is directly in front of the angle of view. When the user B is photographed, since the actual orientation of the lens is exactly the same as the default orientation, the sound source orientation indicated by the recorded audio matches the images captured by the lens. Specifically, in this example, the images show that the user B in front of the camera is speaking, and the audio heard also indicates that the sound source is in front of the camera. However, when the user C is photographed, since positions of the microphones do not change, and the audio is still synthesized in the same way, the sound source orientation indicated by the recorded audio is still directly in front of the angle of view. However, since the actual orientation of the lens is deviated from the default orientation, the sound source orientation indicated by the recorded audio does not match the images captured by the lens. Specifically, in this example, the images show that the user C directly in front of the camera is listening to the user B on the left side. However, the audio indicates that the sound source is directly in front of the camera, as if it were the user C who is speaking.

Figure 3:
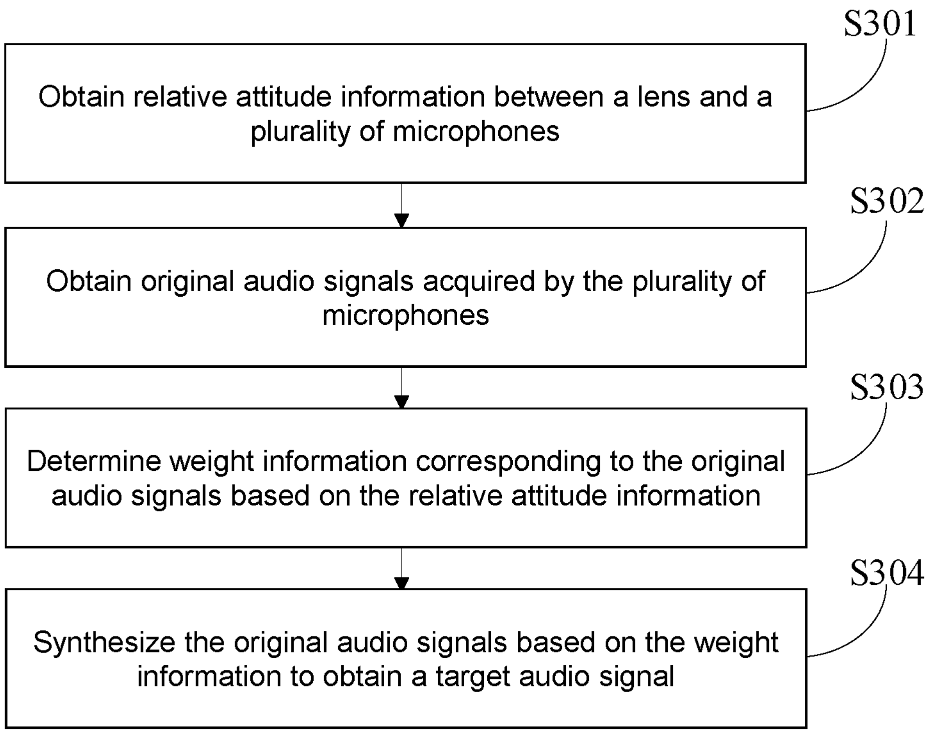
FIG. 3 is a flowchart of an audio processing method according to some exemplary embodiments of this disclosure.

To resolve the foregoing problem, some exemplary embodiments of this disclosure provide an audio processing method. The audio processing method may be applied to the foregoing electronic device with the video photographing function, and the electronic device includes a lens and a plurality of microphones, where "the plurality of" can be understood as at least two. The lens of the electronic device is movable relative to at least one of the plurality of microphones. In other words, some of the plurality of microphones are disposed on the lens (and may move with the lens). FIG. 3 is a flowchart of an audio processing method according to some exemplary embodiments of this disclosure. The method includes the following steps:

S301: Obtain relative attitude information between a lens and a plurality of microphones.

S302: Obtain original audio signals acquired by the plurality of microphones.

S303: Determine weight information corresponding to the original audio signals based on the relative attitude information.

S304: Synthesize the original audio signals based on the weight information to obtain a target audio signal.

In step S304, the synthesized target audio signal is played with images captured by the lens. Specifically, as mentioned above, the target audio signal may be encapsulated with the images captured by the lens in a specific video format to form a video file. When the video file is decapsulated and played, the target audio signal may be played with the images captured by the lens. In other words, the target audio signal may be an audio part of the recorded video, and forms the audio/video with the images captured by the lens.

In the audio processing method provided in some exemplary embodiments of this disclosure, the weight information corresponding to the original audio signal acquired by each microphone is no longer predetermined and fixed. The weight information corresponding to the original audio signals is determined based on the relative attitude information. The relative attitude information herein is the relative attitude information between the lens and the plurality of microphones, and may reflect relative orientation and position relationships between the lens and the microphones. In addition, the relative attitude information may be updated correspondingly after the lens moves relative to the microphones such that the relative attitude information obtained in step S301 may reflect real-time relative attitude between the lens and the microphones.

Figure 4:
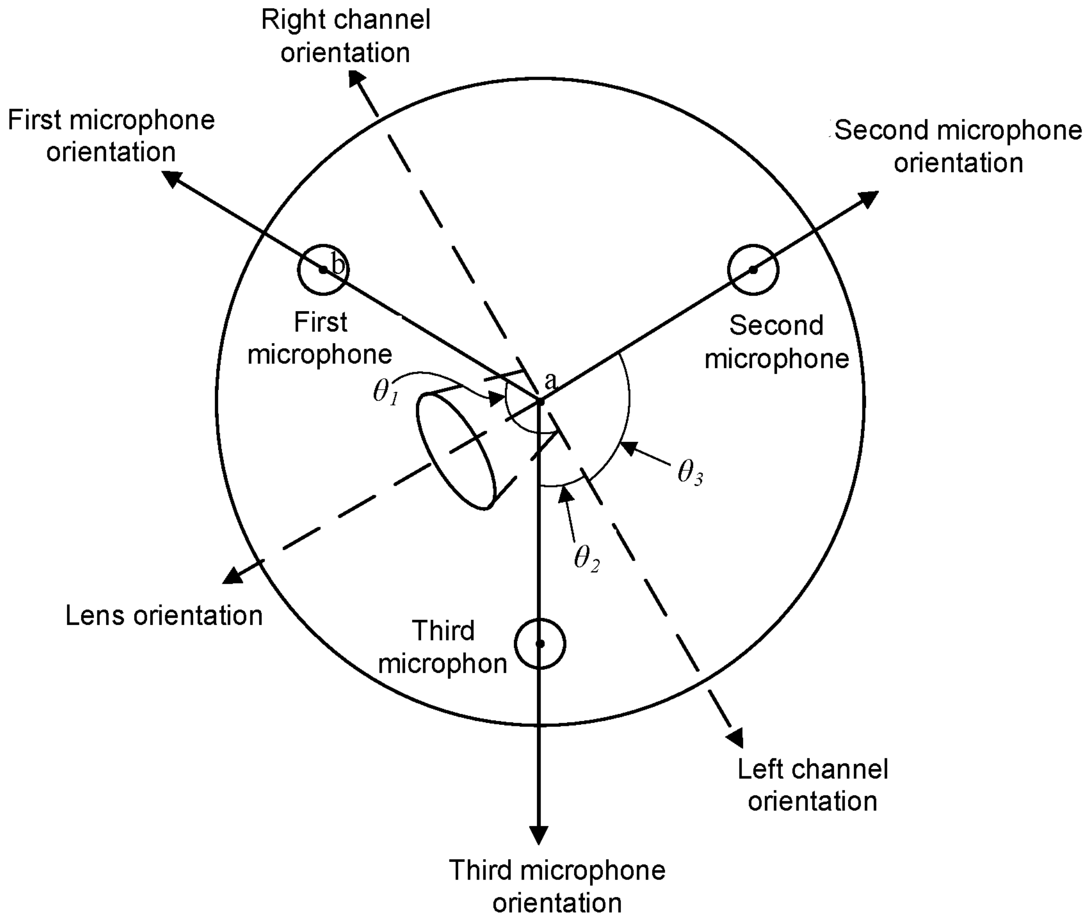
FIG. 4 is a top view of a simplified gimbal camera according to some exemplary embodiments of this disclosure.

In some exemplary embodiments, there may be various ways for determining the relative attitude information. In some exemplary embodiments, the relative attitude information may be determined based on an orientation of each microphone and an attitude of the lens. The orientation of the microphone may be an orientation of the microphone relative to the lens. Specifically, the orientation of the microphone may be determined based on a position of the lens and a position of the microphone. FIG. 4 is a top view of a simplified gimbal camera according to some exemplary embodiments of this disclosure. The position of the lens herein may be a position of a point a (an actual position may be coordinates), the position of a first microphone may be a position of a point b, and an orientation of the first microphone may be a direction from the point a to the point b, and may be determined based on coordinates of the point a and point b (the coordinates may be relative to a body). Orientations of the other microphones may be determined in the same way, and details will not be described herein.

The attitude of the lens may include a position and/or an orientation of the lens. The position of the lens herein may be a position of the lens relative to the body, and the orientation of the lens corresponds to an angle of view of the captured images. In some exemplary embodiments, the lens may be mounted on a body (which may be a body of various devices or platforms) via a gimbal, and the microphones may be fixed on the body. Under control of the gimbal, the lens may move relative to the microphones. In this case, the relative attitude information may be determined based on orientation information of the gimbal. Specifically, the attitude of the lens may be determined based on the orientation information of the gimbal such that the relative attitude information may be determined based on the attitude of the lens and the orientations of the microphones.

The lens may rotate and move under the control of the gimbal. In many scenarios, the lens under the control of the gimbal may rotate. During the rotation, a main change is a change of the orientation of the lens. The position of the lens relative to the body may not change or slightly changes. However, in some scenarios, the lens may also move relative to the body under the control of the gimbal. For example, lenses equipped for some robots may extend, protrude, and slide under the control of the gimbal. During the movement of the lens, the position of the lens relative to the body may change. In other words, a position of the lens relative to the microphones also changes. In this case, the position of the lens may also be determined based on the orientation information of the gimbal.

As described above, to allow a recorded audio to have a stereoscopic effect, the recorded audio needs to have at least two channels of audio signals. In step S304, the synthesized target audio signal may be played on one of at least two channels. The channel corresponding to the target audio signal may be referred to as a target channel.

The channels herein are channels of sound recorded or played at different spatial positions, with corresponding orientations. For example, common dual channels consist of a left channel and a right channel, where "left" and "right" both describe the orientations corresponding to the respective channels. However, the orientations described as "left" and "right" are relative orientations, and actual orientations corresponding to the relative orientations need to be determined based on a reference direction. For example, the reference direction may be a facing direction. When north is faced, the actual orientation corresponding to the relative orientation "left" is west, and the actual orientation corresponding to the relative orientation "right" is east. When east is faced, the actual orientation corresponding to the relative orientation "left" is north, and the actual orientation corresponding to the relative orientation "right" is south.

The orientation of the target channel also has two types: relative orientation and actual orientation. However, considering that the relative orientation is not an absolute orientation, it is inconvenient to directly use the relative orientation in specific implementation. Therefore, an orientation corresponding to the target channel described in this disclosure refers to the actual orientation corresponding to the target channel. The orientation corresponding to the target channel may be determined based on a reference direction, and the reference direction may be the orientation of the lens.

For ease of understanding, reference may be made to FIG. 1. The orientation of the lens is in a 6-o'clock direction in FIG. 1. In the case where the recorded audio includes a left channel and a right channel, when the target channel is the left channel, it is determined that an orientation corresponding to the left channel is in a 3-o'clock direction. When the target channel is the right channel, it is determined that an orientation corresponding to the right channel is in a 9-o'clock direction.

The target audio signal needs to be obtained through the synthesis based on the weight information corresponding to the original audio signals. Weight information of an original audio signal may essentially represent contribution of the original audio signal in the synthesis for obtaining the target audio signal (namely, a proportion of the original audio signal in the synthesis for obtaining the target audio signal). In some exemplary embodiments, contribution (weight information) of an original audio signal in the synthesis for obtaining the target audio signal may be determined based on the relative attitude information between the lens and a microphone corresponding to the original audio signal and the orientation corresponding to the target channel.

That the weight information corresponding to the original audio signal acquired by the microphone is determined based on the relative attitude information of the microphone and the orientation corresponding to the target channel may specifically include: determine deviation information between an orientation of the microphone and the orientation corresponding to the target channel based on the relative attitude information and the orientation corresponding to the target channel, and determine the corresponding weight information based on the deviation information. Reference may be made to FIG. 4. An example in which the target channel is the right channel is described below. The orientation corresponding to the target channel is approximately in an 11-o'clock direction, and the orientation of the first microphone is approximately in a 10-o'clock direction. Deviation information may be used to represent a degree of deviation of the 10-o'clock direction from the 11-o'clock direction such that the weight information corresponding to the original audio signal acquired by the first microphone in the synthesis for obtaining the target audio signal may be determined based on the deviation information.

The deviation information may be represented in various forms. In some exemplary embodiments, the deviation information may be an angle between the orientation of the microphone and the orientation corresponding to the target channel (for convenience of reference, such an angle is referred to as a deviation angle hereinafter). Certainly, there are other implementations. For example, levels used to represent deviation degrees may be preset. As shown in FIG. 4, if the target channel is the right channel, the degree of the deviation of the orientation (10-o'clock direction) of the first microphone from the orientation (11-o'clock direction) corresponding to the target channel may be level 1. If the target channel is the left channel, the degree of the deviation of the orientation (10-o'clock direction) of the first microphone from the orientation (5-o'clock direction) corresponding to the target channel may be level 5.

The weight information may be determined based on the deviation information. In some exemplary embodiments, when the deviation information is represented by the foregoing deviation angle, the weight information corresponding to the original audio signal may be determined based on a cosine of the deviation angle.

FIG. 4 is still used as an example. If the recorded channels include the left channel and the right channel, and the target channel is the left channel, a target audio signal $D_L$ corresponding to the left channel may be obtained through synthesis with the following formula:

$$D_L=w_{1L}D_1+w_{2L}D_2+w_{3L}D_3$$

where $D_i$ represents an original audio signal acquired by an ith microphone (i=1, 2, 3), and wiL represents weight information corresponding to the original audio signal acquired by the ith microphone.

Considering that the orientation of the first microphone relative to the lens is on the right and the target channel is the left channel, if the foregoing deviation angle is used to represent the deviation, the deviation angle corresponding to the first microphone is $\theta_1$ in FIG. 4. Because a deviation angle greater than 90° indicates that the orientation of the microphone and the orientation corresponding to the target channel are opposite, it is readily understandable that a degree of participation of the original audio signal acquired by the microphone in the synthesis for obtaining the target audio signal should be reduced, that is, the weight information corresponding to the original audio signal should be reduced. In some exemplary embodiments, an angle threshold of 90° may be preset. When a deviation angle corresponding to a microphone is greater than the angle threshold, it is determined that weight information corresponding to an original audio signal acquired by the microphone is 0.

The deviation angle $\theta_1$ of the first microphone in FIG. 4 is greater than 90°. Therefore, the weight information $w_{1L}$ corresponding to the original audio signal $D_1$ acquired by the first microphone may be set to 0. In other words, $D_1$ does not participate in the synthesis for obtaining $D_L$. In this case, the synthesis formula for obtaining the audio signal $D_L$ on the left channel may be simplified as follows:

$$D_L=w_{2L}D_2+w_{3L}D_3$$

The following formulas are used to calculate $w_{2L}$ and $w_{3L}$:

$$w_{2L}=\frac{\cos\theta_2}{\cos\theta_2+\cos\theta_3}$$

$$w_{3L}=\frac{\cos\theta_3}{\cos\theta_2+\cos\theta_3}$$

where $\theta_2$ represents a deviation angle corresponding to a second microphone, and $\theta_3$ represents a deviation angle corresponding to a third microphone.

It may be understood that the cosine of the deviation angle reflects a projection of a unit vector in a same direction as the orientation of the microphone in the orientation corresponding to the target channel. Smaller deviation between the orientation of the microphone and the orientation corresponding to the target channel indicates a larger cosine of the deviation angle corresponding to the microphone, and larger weight information corresponding to the original audio signal acquired by the microphone.

In the foregoing formulas for calculating $w_{2L}$ and $w_{3L}$, $w_{2L}$ and $w_{3L}$ are normalized. The normalization of the weight information may make the synthesized target audio signal more proper on an amplitude level.

It should be noted that in the audio processing method provided in some exemplary embodiments of this disclosure, when the weight information corresponding to the original audio signals is determined, the weight information corresponding to the original audio signal acquired by each microphone may also be determined. In the foregoing example corresponding to FIG. 4, the weight information corresponding to $D_1$, $D_2$, and $D_3$ may be determined as follows: $w_{1L}=0$, and $w_{2L}$ and $w_{3L}$ are non-zero values. In some exemplary embodiments, it may be first determined based on the relative attitude information which original audio signals acquired by the microphones participate in the synthesis for obtaining the target audio signal, and then weight information corresponding to these original audio signals that participate in the synthesis for obtaining the target audio signal is determined. In the foregoing example corresponding to FIG. 4, it may be first determined based on the relative attitude information that the orientation of the first microphone deviates from the orientation corresponding to the target channel. Therefore, it may be determined that only the original audio signal $D_2$ acquired by the second microphone and the original audio signal $D_3$ acquired by the third microphone participate in the synthesis for obtaining the target audio signal $D_L$. Therefore, only the weight information corresponding to $D_2$ and $D_3$ needs to be determined.

It is readily understandable that although some exemplary embodiments of this disclosure is described in terms of the target audio signal corresponding to one of the at least two channels, in practical application, an audio signal corresponding to each channel may be obtained through synthesis by using the method provided in this disclosure. In the foregoing example corresponding to FIG. 4, if the target channel is the right channel, the target audio signal to be obtained through synthesis is the audio signal $D_R$ on the right channel. The synthesis is implemented by using the following formula:

$$D_R = w_{1R}D_1 + w_{2R}D_2 + w_{3R}D_3$$

$$w_{1R} = \frac{\cos\theta_1}{\cos\theta_1}$$

$$w_{2R} = 0$$

$$w_{3R} = 0$$

For the foregoing formula, reference may be made to FIG. 4 and the previous related description about the synthesized target audio signal $D_L$. Details are not described herein.

After the audio signals $D_L$ and $D_R$ are obtained through synthesis, $D_L$ is played on the left channel and $D_R$ is played on the right channel. This may produce an auditory sense of orientation that matches the angle of view of the captured images.

In the audio processing method provided in some exemplary embodiments of this disclosure, when the target audio signal is obtained by synthesizing the original audio signals acquired by the plurality of microphones, the weight information corresponding to the original audio signals is determined based on the relative attitude information between the lens and the microphones corresponding to the original audio signals. In this way, even if the angle of view of the images captured by the lens changes relative to the microphones, the target audio signal obtained after the synthesis based on the relative attitude information may still match the images captured by the lens, so as to provide users with consistent visual and auditory senses of orientation.

In the above various implementations, the "orientation of the lens" refers to the actual orientation of the lens. After a series of processing based on the orientation of the lens, the target audio signal that provides a sense of orientation consistent with the captured images may be finally obtained after the synthesis. However, in a special scenario, a user does not want the recorded audio to have a sense of orientation consistent with the captured images, but hopes that a sound source orientation indicated by the recorded audio is a specified orientation.

To facilitate the understanding of the foregoing special scenario, the description may be provided in combination with the foregoing example corresponding to FIG. 2. In the case where the foregoing audio processing method is used to process the audio, when the audio is played with the captured images, the user may perceive that the sound source orientation indicated by the audio changes from the front to the left when the angle of view is rotated from aiming at the user B to aiming at the user C, and the audio and images provide consistent sense of orientation. However, for some reason, the user A wants to change the sound source orientation indicated by the audio from the front to the right when the angle of view is rotated to from aiming at the user B to aiming at the user C.

For this special requirement of the user A, in some exemplary embodiments of this disclosure, the user may set the "orientation of the lens". In this case, the "orientation of the lens" set by the user is actually a virtual orientation. The virtual orientation and the actual orientation of the lens are independent and unrelated to each other. The virtual orientation set by the user may be used to guide the synthesis for obtaining the target audio signal.

In the example corresponding to FIG. 2, the sound source orientation indicated by the audio is on the right. If the user A wants the angle of view to aim at the user C, the user A may set the "orientation of the lens" to the 3-o'clock direction. In this case, the user B (in the 6-o'clock direction) who is speaking is on the right relative to the virtual orientation, and the sound source orientation indicated by the synthesized audio is also on the right. In this way, the purpose of the user A is achieved.

The user may set the "orientation of the lens" such that the synthesized audio may provide a sense of orientation desired by the user, and may better adapt to requirements of different users.

The foregoing describes in detail an audio processing method provided in some exemplary embodiments of this disclosure.

Figure 5:
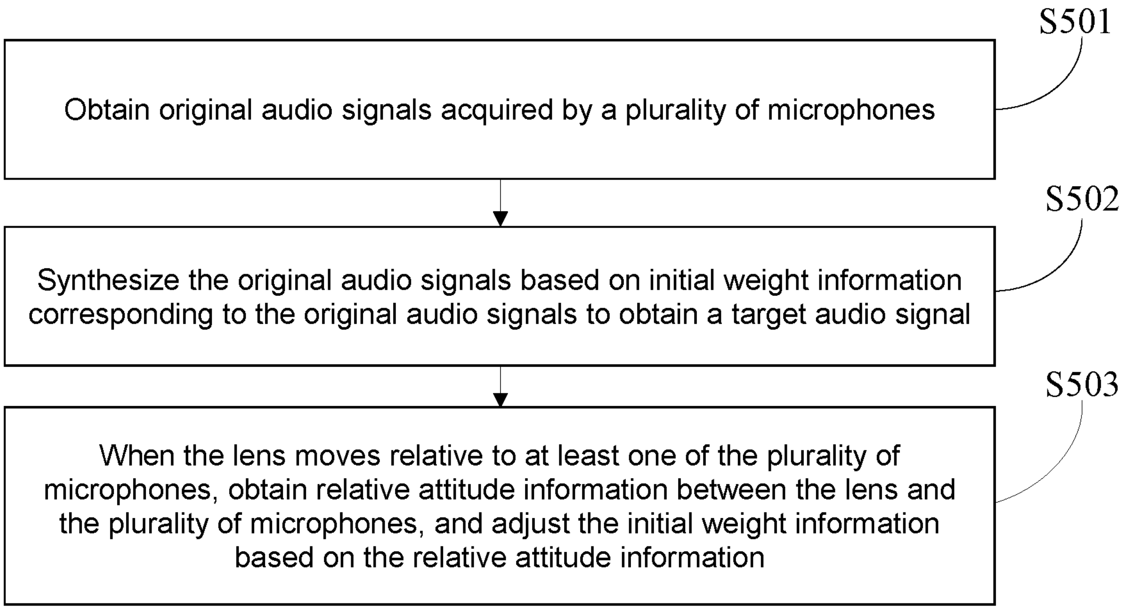
FIG. 5 is a flowchart of an audio processing method according to some exemplary embodiments of this disclosure.

FIG. 5 is a flowchart of another audio processing method according to some exemplary embodiments of this disclosure. The method includes the following steps:

S501: Obtain original audio signals acquired by a plurality of microphones.

S502: Synthesize the original audio signals based on initial weight information corresponding to the original audio signals to obtain a target audio signal.

The target audio signal is played with images captured by a lens.

S503: When the lens moves relative to at least one of the plurality of microphones, obtain relative attitude information between the lens and the plurality of microphones, and adjust the initial weight information based on the relative attitude information.

The lens is mounted on a body via a gimbal, and the microphones are fixed on the body.

The relative attitude information is determined based on orientation information of the gimbal.

In some exemplary embodiments, the relative attitude information is determined based on orientations of the microphones and an attitude of the lens.

In some exemplary embodiments, the attitude of the lens includes an orientation of the lens and/or a position of the lens.

In some exemplary embodiments, the target audio signal is played on a target channel of the at least two channels.

In some exemplary embodiments, that the initial weight information is adjusted based on the relative attitude information includes:

Adjust the initial weight information based on the relative attitude information and an orientation corresponding to the target channel, where the orientation corresponding to the target channel is determined based on an orientation of the lens.

In some exemplary embodiments, that the initial weight information is adjusted based on the relative attitude information and the orientation corresponding to the target channel includes:

Determine deviation information between an orientation of each microphone and the orientation corresponding to the target channel based on the relative attitude information and the orientation corresponding to the target channel, determine new weight information based on the deviation information, and adjust the initial weight information based on the new weight information.

In some exemplary embodiments, the deviation information includes an angle between the orientation of the microphone and the orientation corresponding to the target channel.

In some exemplary embodiments, the new weight information is determined based on a cosine of the angle.

In some exemplary embodiments, if the angle is greater than a preset angle, it is determined that the new weight information corresponding to the original audio signal acquired by the microphone is zero in the synthesis for obtaining the target audio signal.

In some exemplary embodiments, the new weight information is normalized.

In some exemplary embodiments, the orientation of the lens includes a virtual orientation set by a user, and the virtual orientation is independent of an actual orientation of the lens.

In some exemplary embodiments, the at least two channels include a left channel and a right channel.

In the audio processing method provided in some exemplary embodiments of this disclosure, when the target audio signal is obtained by synthesizing the original audio signals acquired by the plurality of microphones, the weight information corresponding to the original audio signals are obtained by adjusting the initial weight information corresponding to the original audio signals based on the relative attitude information, where the relative attitude information may reflect relative orientation and position relationships between the lens and the microphones corresponding to the original audio signals. In this way, even if an angle of view of the images captured by the lens changes relative to the microphones, the target audio signal obtained after the synthesis based on the relative attitude information may still match the images captured by the lens, so as to provide users with consistent visual and auditory senses of orientation.

For the audio processing method in the foregoing various implementations, reference may be made to the corresponding description of the foregoing first audio processing method. Details will not be described herein.

Figure 6:
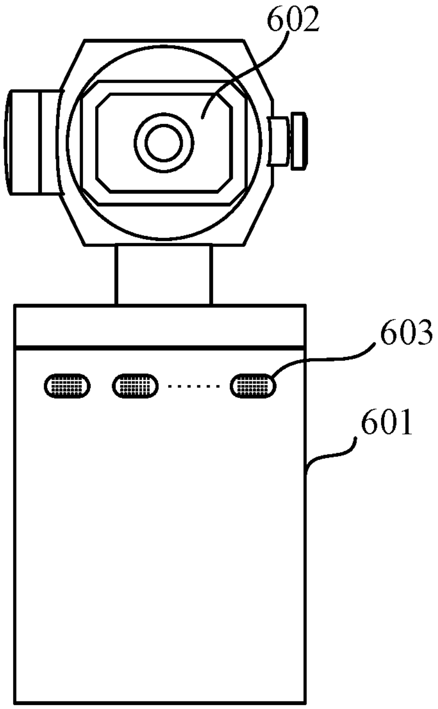
FIG. 6 is a schematic structural diagram of an exemplary electronic device according to some exemplary embodiments of this disclosure.

FIG. 6 is a schematic structural diagram of an exemplary electronic device according to some exemplary embodiments of this disclosure. The exemplary electronic device includes a body 601, a lens 602 mounted on the body, a plurality of microphones 603, at least one processor, and at least one memory storing a computer program. The lens 602 is movable relative to at least one of the plurality of microphones 603.

The processor implements the following steps when executing the computer program:

Obtain relative attitude information between the lens and the plurality of microphones.

Obtain original audio signals acquired by the plurality of microphones.

Determine weight information corresponding to the original audio signals based on the relative attitude information.

Synthesize the original audio signals based on the weight information to obtain a target audio signal, where the target audio signal is played with images captured by the lens.

In some exemplary embodiments, the electronic device may further include a gimbal. The lens is mounted on the body through the gimbal, and the microphones are fixed on the body.

The relative attitude information is determined based on orientation information of the gimbal.

In some exemplary embodiments, the relative attitude information is determined based on orientations of the microphones and an attitude of the lens.

In some exemplary embodiments, the attitude of the lens includes an orientation of the lens and/or a position of the lens.

In some exemplary embodiments, the target audio signal is played on a target channel of the at least two channels.

In some exemplary embodiments, when determining the weight information corresponding to the original audio signals based on the relative attitude information, the processor is specifically configured to determine the weight information based on the relative attitude information and an orientation corresponding to the target channel, where the orientation corresponding to the target channel is determined based on an orientation of the lens.

In some exemplary embodiments, when determining the weight information based on the relative attitude information and the orientation corresponding to the target channel, the processor is specifically configured to determine deviation information between an orientation of each microphone and the orientation corresponding to the target channel based on the relative attitude information and the orientation corresponding to the target channel, and determine the weight information based on the deviation information.

In some exemplary embodiments, the deviation information includes an angle between the orientation of the microphone and the orientation corresponding to the target channel.

In some exemplary embodiments, the weight information is determined based on a cosine of the angle.

In some exemplary embodiments, if the angle is greater than a preset angle, it is determined that the weight information corresponding to the original audio signal acquired by the microphone is zero during the synthesis for obtaining the target audio signal.

In some exemplary embodiments, the orientation of the lens includes a virtual orientation set by a user, and the virtual orientation is independent of an actual orientation of the lens.

In some exemplary embodiments, the weight information is normalized.

In some exemplary embodiments, the at least two channels include a left channel and a right channel.

In some exemplary embodiments, the electronic device may further include a plurality of speakers. The speakers have a one-to-one corresponding relationship with the channels.

In some exemplary embodiments, the electronic device may be any one of a UAV, a gimbal camera, a surveillance camera, a panoramic camera, and a robot.

In the electronic device provided in some exemplary embodiments of this disclosure, when the target audio signal is obtained by synthesizing the original audio signals acquired by the plurality of microphones, the weight information corresponding to the original audio signals is determined based on the relative attitude information between the lens and the microphones corresponding to the original audio signals. In this way, even if an angle of view of the images captured by the lens changes relative to the microphones, the target audio signal obtained after the synthesis based on the relative attitude information may still match the images captured by the lens, to provide users with consistent visual and auditory senses of orientation.

For the electronic device in the foregoing various implementations, reference may be made to the corresponding description of the foregoing first audio processing method. Details will not be described herein.

Some exemplary embodiments of this disclosure further provide an electronic device. Still refer to FIG. 6. The electronic device includes a body 601, a lens 602 mounted on the body 601, a plurality of microphones 603, a processor, and a memory storing a computer program. The lens 602 is movable relative to at least one of the plurality of microphones 603.

The processor implements the following steps when executing the computer program:

obtaining original audio signals acquired by the plurality of microphones;

synthesizing the original audio signals based on initial weight information corresponding to the original audio signals to obtain a target audio signal, where the target audio signal is played with images captured by a lens; and when the lens moves relative to at least one of the plurality of microphones, obtaining relative attitude information between the lens and the plurality of microphones, and adjusting the initial weight information based on the relative attitude information.

In some exemplary embodiments, the electronic device may further include a gimbal. The lens is mounted on the body through the gimbal, and the microphones are fixed on the body.

The relative attitude information is determined based on orientation information of the gimbal.

In some exemplary embodiments, the relative attitude information is determined based on orientations of the microphones and an attitude of the lens.

In some exemplary embodiments, the attitude of the lens includes an orientation of the lens and/or a position of the lens.

In some exemplary embodiments, the target audio signal is played on a target channel of the at least two channels.

In some exemplary embodiments, when adjusting the initial weight information based on the relative attitude information, the processor is specifically configured to adjust the initial weight information based on the relative attitude information and an orientation corresponding to the target channel, where the orientation corresponding to the target channel is determined based on an orientation of the lens.

In some exemplary embodiments, when adjusting the initial weight information based on the relative attitude information and an orientation corresponding to the target channel, the processor is specifically configured to determine deviation information between an orientation of each microphone and the orientation corresponding to the target channel based on the relative attitude information and the orientation corresponding to the target channel, determine new weight information based on the deviation information, and adjust the initial weight information based on the new weight information.

In some exemplary embodiments, the deviation information includes an angle between the orientation of the microphone and the orientation corresponding to the target channel.

In some exemplary embodiments, the new weight information is determined based on a cosine of the angle.

In some exemplary embodiments, if the angle is greater than a preset angle, it is determined that the new weight information corresponding to the original audio signal acquired by the microphone is zero during the synthesis for obtaining the target audio signal.

In some exemplary embodiments, the new weight information is normalized.

In some exemplary embodiments, the orientation of the lens includes a virtual orientation set by a user, and the virtual orientation is independent of an actual orientation of the lens.

In some exemplary embodiments, the at least two channels include a left channel and a right channel.

In some exemplary embodiments, the electronic device may further include a plurality of speakers. The speakers have a one-to-one corresponding relationship with the channels.

In some exemplary embodiments, the electronic device may be any one of a UAV, a gimbal camera, a surveillance camera, a panoramic camera, and a robot.

With the electronic device provided in some exemplary embodiments of this disclosure, when the target audio signal is obtained by synthesizing the original audio signals acquired by the plurality of microphones, the weight information corresponding to the original audio signals are obtained by adjusting the initial weight information corresponding to the original audio signals based on the relative attitude information, where the relative attitude information may reflect relative orientation and position relationships between the lens and the microphones corresponding to the original audio signals. In this way, even if an angle of view of the images captured by the lens changes relative to the microphones, the target audio signal obtained after the synthesis based on the relative attitude information may still match the images captured by the lens, to provide users with consistent visual and auditory senses of orientation.

For the electronic device in the foregoing various implementations, reference may be made to the corresponding description of the foregoing first audio processing method. Details will not be described herein.

Some exemplary embodiments of this disclosure further provide a computer-readable storage medium. The computer-readable storage medium stores a computer program. When the computer program is executed by a processor, the first audio processing method in the foregoing various implementations may be implemented.

Some exemplary embodiments of this disclosure further provide a computer-readable storage medium. The computer-readable storage medium stores a computer program. When the computer program is executed by a processor, the second audio processing method in the foregoing various implementations may be implemented.

Provided that there is no conflict or contradiction in the technical features provided in the foregoing exemplary embodiments, those skilled in the art may combine the technical features based on actual conditions to form various exemplary embodiments. A length of this disclosure is limited, and the various exemplary embodiments are not described, but it may be understood that the various exemplary embodiments also belong to the scope disclosed by the exemplary embodiments of this disclosure.

In addition, some exemplary embodiments of this disclosure may provide a form of a computer program product that is implemented on one or more computer-usable storage media (including, but not limited to, a disk memory, a compact disc read-only memory (CD-ROM), an optical memory, and the like) that include program code. The computer-usable storage media include non-volatile and volatile, and removable and non-removable media, and information storage may be implemented by any method or technology. The information may be computer-readable instructions, data structures, modules of programs, or other data. Examples of storage media of computers include but are not limited to a phase-change memory (PRAM), a static random access memory (SRAM), a dynamic random access memory (DRAM), another type of random access memory (RAM), a read-only memory (ROM), an electrically erasable programmable ROM (EEPROM), a flash memory or another memory technology, a CD-ROM, a digital versatile disc (DVD) or another optical memory, a magnetic tape cassette, magnetic tape and magnetic disk storage or another magnetic storage device, or any other non-transmission media. The storage media may be used to store information that may be accessed by a computing device.

It should be noted that relational terms herein such as first and second are merely used herein to distinguish one entity or operation from another entity or operation without necessarily requiring or implying any actual such relationship or order between the entities or operations. The term "comprise", "include", or any other variation thereof is intended to cover a non-exclusive inclusion such that a process, method, article, or device that includes a range of elements includes not only those elements but also other elements that are not explicitly listed or that are inherent to such process, method, article, or device. Without further restrictions, an element defined in the sentence "including a . . . " do not exclude the existence of other identical elements in a process, method, article, or device including the element.

The method and apparatus provided in some exemplary embodiments of this disclosure have been described in detail above. The principles and implementations of this disclosure are described herein with specific examples. The description of these exemplary embodiments is merely provided to help understand the method and core idea of this disclosure. In addition, a person of ordinary skill in the art can make variations and modifications to this disclosure. Therefore, the contents provided herein shall not be construed as limitations on this disclosure.

What is claimed is:

1. An audio processing method, comprising:

obtaining relative attitude information between a lens and a plurality of microphones, wherein the lens is movable relative to at least one of the plurality of microphones;

obtaining original audio signals by the plurality of microphones;

determining weight information of the original audio signals based on the relative attitude information; and synthesizing the original audio signals based on the weight information to obtain a target audio signal to be played with images captured by the lens, wherein the weight information is configured to indicate a contribution of each of the original audio signals respectively obtained by the plurality of microphones for synthesizing the original audio signals into the target audio signal.

2. The audio processing method according to claim 1, wherein the lens is mounted on a body via a gimbal;

the plurality of microphones is fixed on the body; and the relative attitude information is determined based on orientation information of the gimbal.

3. The audio processing method according to claim 1, wherein the relative attitude information is determined based on orientations of the plurality of microphones and an attitude of the lens.

4. The audio processing method according to claim 3, wherein the attitude of the lens includes at least one of an orientation of the lens, or a position of the lens.

5. The audio processing method according to claim 1, wherein the target audio signal is played on a target channel of at least two channels.

6. The audio processing method according to claim 5, wherein the determining of the weight information of the original audio signals based on the relative attitude information includes:

determining the weight information based on the relative attitude information and an orientation of the target channel determined based on an orientation of the lens.

7. The audio processing method according to claim 6, wherein the determining of the weight information based on the relative attitude information and the orientation of the target channel includes:

determining deviation information between orientations of the plurality of microphones and the orientation of the target channel based on the relative attitude information and the orientation of the target channel; and determining the weight information based on the deviation information.

8. The audio processing method according to claim 7, wherein the deviation information includes an angle between the orientation of each of the plurality of microphones and the orientation of the target channel.

9. The audio processing method according to claim 8, wherein the weight information is determined based on a cosine of the angle.

10. The audio processing method according to claim 8, further comprising:

determining, upon determining that the angle is greater than a preset angle, that the weight information of the original audio signals is zero for the synthesizing to obtain the target audio signal.

11. The audio processing method according to claim 6, wherein the orientation of the lens includes a virtual orientation, independent of an actual orientation of the lens, set by a user.

12. The audio processing method according to claim 5, wherein the at least two channels include a left channel and a right channel.

13. The audio processing method according to claim 1, wherein the weight information is normalized.

14. An audio processing method, comprising:

obtaining original audio signals by a plurality of microphones;

synthesizing the original audio signals based on initial weight information of the original audio signals to obtain a target audio signal to be played with images captured by a lens, wherein the initial weight information is configured to indicate a contribution of each of the original audio signals respectively obtained by the plurality of microphones for synthesizing the original audio signals into the target audio signal;

determining that the lens moves relative to at least one of the plurality of microphones;

obtaining relative attitude information between the lens and the plurality of microphones; and adjusting the initial weight information based on the relative attitude information.

15. The audio processing method according to claim 14, wherein the lens is mounted on a body via a gimbal; and the plurality of microphones are fixed on the body; and the relative attitude information is determined based on orientation information of the gimbal.

16. The audio processing method according to claim 14, wherein the relative attitude information is determined based on orientations of the plurality of microphones and an attitude of the lens.

17. The audio processing method according to claim 16, wherein the attitude of the lens includes at least one of an orientation of the lens, or a position of the lens.

18. The audio processing method according to claim 14, wherein the target audio signal is played on a target channel of at least two channels.

19. The audio processing method according to claim 18, wherein the adjusting of the initial weight information based on the relative attitude information includes:

adjusting the initial weight information based on the relative attitude information and an orientation of the target channel determined based on an orientation of the lens.

20. The audio processing method according to claim 19, wherein the adjusting of the initial weight information based on the relative attitude information and the orientation of the target channel includes:

determining deviation information between an orientations of the plurality of microphones and the orientation of the target channel based on the relative attitude information and the orientation of the target channel; and adjusting the initial weight information based on the deviation information.

* * * * *